Mar. 20, 1923.
A. T. POTTER.
WINDSHIELD PIVOT MOUNTING.
FILED MAR. 5, 1921.
1,449,055.
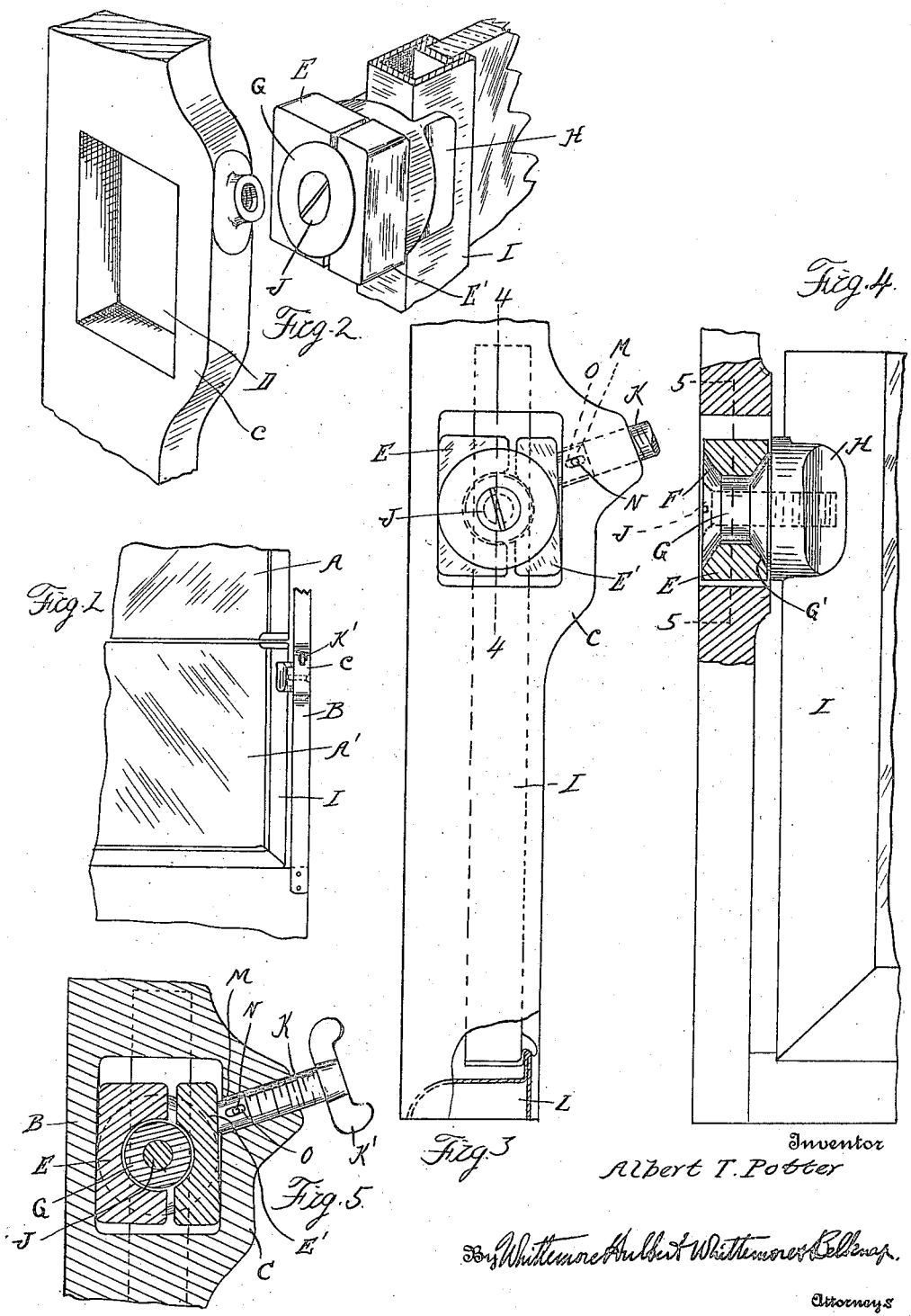

Patented Mar. 20, 1923.

1,449,055

UNITED STATES PATENT OFFICE.

ALBERT T. POTTER, OF DETROIT, MICHIGAN, ASSIGNOR TO AINSWORTH MANUFACTURING COMPANY, OF DETROIT, MICHIGAN, A CORPORATION OF MICHIGAN.

WINDSHIELD PIVOT MOUNTING.

Application filed March 5, 1921. Serial No. 449,800.

*To all whom it may concern:*

Be it known that I, ALBERT T. POTTER, a citizen of the United States of America, residing at Detroit, in the county of Wayne and State of Michigan, have invented certain new and useful Improvements in Windshield Pivot Mountings, of which the following is a specification, reference being had therein to the accompanying drawings.

This invention relates to windshield pivot mountings, and the invention consists in an improved means for clamping the pivot members of a windshield rigidly to the standard thereof in various positions of angular adjustment. A further feature of the invention is the provision for such vertical adjustment of the windshield as may be requisite to disengage the lower edge of the shield from its sealing relation with the cowl or dash.

A preferred embodiment of the invention is herein described and is illustrated in the accompanying drawing wherein:

Figure 1 is a view in rear elevation of a side portion of a windshield and the corresponding supporting standard;

Figure 2 is a perspective view showing the bearing parts disassembled;

Figure 3 is a fragmentary side view of the bearing portion of the standard;

Figure 4 is a vertical sectional view of the same, taken on line 4—4 of Figure 3;

Figure 5 is a vertical section on line 5—5 of Figure 4.

In these views the reference characters A and A' respectively designate the upper and lower sections of a windshield, and B indicates one of the uprights or standards upon which said sections are mounted. Said standard is formed with an enlargement C to accommodate a pivot bearing for the section A, a rectangular slot D being formed in said enlargement. Within said slot there is adjustably mounted a two-part bearing comprising my complementary members E and E', the sides of which are jointly conically beveled as indicated at F. Said bearing is engaged by an annularly grooved pivot member G, the walls G' of the groove of said member being beveled to correspond to the bevel F of the bearing members E and E'. The pivot member G is formed with a slotted head H which embraces the frame I of the windshield section A, and a screw J is passed freely through the said pivot member and is threaded into the frame of the windshield section to retain the latter engaged in said slot. K is a clamping screw threaded into the enlargement C of the standard B, and having a wing head K' by which said screw may be adjusted to press the bearing members E and E' together so as to clamp the same upon the pivot member, wedging their beveled portions into the groove of said pivot member. The construction is such that the clamping stress is applied entirely between the beveled faces of the bearing members and the corresponding beveled faces of the pivot member. Furthermore, the construction is one that distributes the clamping stress equally between the opposed beveled faces of the bearing members, and over the entire area of said faces, so that a maximum frictional resistance to movement is created. The screw K, as is best seen in Figure 3, bears upon the member E' above the axis of the pivot bearing so as to derive a leverage in exerting the clamping stress. Also said screw is preferably arranged at a slight upward inclination so that it may be more conveniently manipulated by the driver of a motor vehicle. In addition to maintaining the pivot member G clamped between the complementary bearing members E and E', the screw K holds said bearing members and the engaged pivot adjusted at the desired elevation in the slot D. The vertical adjustment afforded by said slot is to permit establishment of a weather seal between the cover edge of the section A and the cowl or dash L.

It is preferred to interpose between the clamping screw K and the bearing members E, E' a non-rotative thrust member M having its end faces relatively inclined to give a maximum bearing surface between said ends and the screw K and member E' respectively. A pin N is engaged in a slot O of said thrust member to hold the same against rotation without preventing transmission of the clamping stress.

What I claim as my invention is:

1. In a windshield pivot mounting, the combination with a windshield and a supporting member therefor, of a sectional bearing carried by said supporting member, a pivot member carried by said windshield and extending between the bearing sections, a rotatable member threaded into said supporting member and adapted to abut one section of said bearing, said bearing being movable with respect to said supporting member independently of said rotatable member, and means for adjusting said rotatable member to force a portion of one section of said bearing against said supporting member and to force one side of the other section against said supporting member whereby said pivot member will be non-rotatively clamped between both sections of said bearing member and said sectional bearing will be retained in adjusted position with respect to said supporting member.

2. In a windshield pivot mounting, the combination with a windshield and a supporting member therefor, of a sectional support movable transversely and vertically of said supporting member, each section having a conically beveled portion, a pivot member carried by said windshield and extending between said bearing sections, said pivot member having conically beveled portions engageable with the beveled portions of said bearing sections for preventing accidental movement of said bearing sections transversely of said supporting member, and clamping means engageable with one of said sections to force a portion thereof against said supporting member and to force the other section against said supporting member whereby the beveled portions of both bearing sections will engage the beveled portions of said pivot member to clamp said pivot member non-rotatively, said clamping means also being adapted to prevent said bearing sections from moving vertically with respect to said supporting member and cooperating with the beveled portions of said pivot member to prevent any accidental movement of said sections transversely of said supporting member.

In testimony whereof I affix my signature.

ALBERT T. POTTER.